US008416349B2

(12) United States Patent
Adachi

(10) Patent No.: US 8,416,349 B2
(45) Date of Patent: Apr. 9, 2013

(54) BROADCAST RECEPTION DEVICE AND ANTENNA CONNECTION DETECTION METHOD FOR BROADCAST RECEPTION DEVICE

(75) Inventor: Kazuteru Adachi, Osaka (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 1039 days.

(21) Appl. No.: 12/284,221

(22) Filed: Sep. 20, 2008

(65) Prior Publication Data
US 2009/0079879 A1    Mar. 26, 2009

(30) Foreign Application Priority Data

Sep. 25, 2007  (JP) .................. 2007-247308

(51) Int. Cl.
*H04N 5/50* (2006.01)
(52) U.S. Cl.
USPC ............................. 348/732; 348/731; 348/733
(58) Field of Classification Search .................... 348/731
See application file for complete search history.

(56) References Cited

U.S. PATENT DOCUMENTS

| 2006/0010474 A1* | 1/2006 | Tsukamoto | 725/72 |
| 2006/0174317 A1* | 8/2006 | Onomatsu et al. | 725/151 |
| 2007/0199026 A1* | 8/2007 | Kim | 725/63 |

FOREIGN PATENT DOCUMENTS

| JP | 2002-122651 A | 4/2002 |
| JP | 2005-354253 A | 12/2005 |
| JP | 2006-025199 A | 1/2006 |
| JP | 2006-025199 A | 1/2006 |
| JP | 2006-157338 A | 6/2006 |
| JP | 2006-157340 A | 6/2006 |
| JP | 2006-186967 A | 7/2006 |

OTHER PUBLICATIONS

Japanese Notice of the reason for refusal, dated Sep. 30, 2009.

* cited by examiner

*Primary Examiner* — Jefferey Harold
*Assistant Examiner* — Michael Teitelbaum
(74) *Attorney, Agent, or Firm* — Yokoi & Co., U.S.A., Inc.; Toshiyuki Yokoi

(57) ABSTRACT

The present invention discloses a broadcast reception device including a connection section for connecting to a smart antenna that switches directivity or a unidirectional antenna with fixed directivity connected; a first channel search section for executing channel search in the smart antenna; a second channel search section for executing channel search in the unidirectional antenna; a communication section for providing the connected smart antenna with power and a control signal; and a connection detection section for detecting a voltage of the communication section varied by voltage drop caused by the communication section connected to the smart antenna, and detect one of presence and absence of connection of the smart antenna based on a result of the detection, the first channel search section is selected to execute the channel search when the connection detection section detects the connection of the smart antenna, and the second channel search section is selected to execute the channel search when the connection detection section does not detect the connection of the smart antenna.

1 Claim, 5 Drawing Sheets

FIG. 3A

| PHYSICAL CHANNEL NUMBER | VIRTUAL CHANNEL NUMBER | | | | | | ANALOG/DIGITAL | | | SCRAMBLE |
|---|---|---|---|---|---|---|---|---|---|---|
| | SUB-CHANNEL | | | | | | ANALOG IDENTIFIER | DIGITAL IDENTIFIER | CONFIRMATION FLAG | |
| | 0 | 1 | 2 | 3 | ... | 99 | | | | |
| 1 | | ○ | | | | | ○ | | | |
| 2 | | | ○ | ○ | | | | | | ○ |
| 3 | | ○ | | | | | | ○ | | |
| 4 | | | | | | | | | | |
| 5 | | | | | | | | | | |
| 6 | | | | | | | | | | |
| 7 | ○ | | | | | | | | | |
| 8 | | ○ | ○ | | | | | ○ | ○ | ○ |
| 9 | | | | | | | | | | |
| 10 | | ○ | ○ | ○ | | | | ○ | ○ | ○ |
| ... | ..... | ..... | ..... | ..... | ..... | ..... | ..... | ..... | ..... | ..... |
| 125 | | | | | ⋮ | | | | | |

FIG. 3B

| PHYSICAL CHANNEL NUMBER | VIRTUAL CHANNEL NUMBER | | | | | | ANALOG/DIGITAL | | | SCRAMBLE | DIRECTION |
|---|---|---|---|---|---|---|---|---|---|---|---|
| | SUB-CHANNEL | | | | | | ANALOG IDENTIFIER | DIGITAL IDENTIFIER | CONFIRMATION FLAG | | |
| | 0 | 1 | 2 | 3 | ... | 99 | | | | | |
| 1 | | ○ | | | | | ○ | | | | |
| 2 | | | ○ | ○ | | | | | ○ | ○ | 1 |
| 3 | | ○ | ○ | | | | | ○ | ○ | ○ | 2 |
| 4 | | ○ | | | | | | | | | |
| 5 | | | | | | | | | | | |
| 6 | | | | | | | | | | | |
| 7 | | | | | | | | | | | |
| 8 | ○ | ○ | ○ | ○ | | | | ○ | ○ | ○ | 3 |
| 9 | | | | | | | | | | | |
| 10 | | ○ | ○ | | | | | ○ | ○ | ○ | 4 |
| ... | ..... | ..... | ..... | ..... | ..... | ..... | ..... | ..... | ..... | ..... | ..... |
| 125 | | | | | ⋮ | | | | | | |

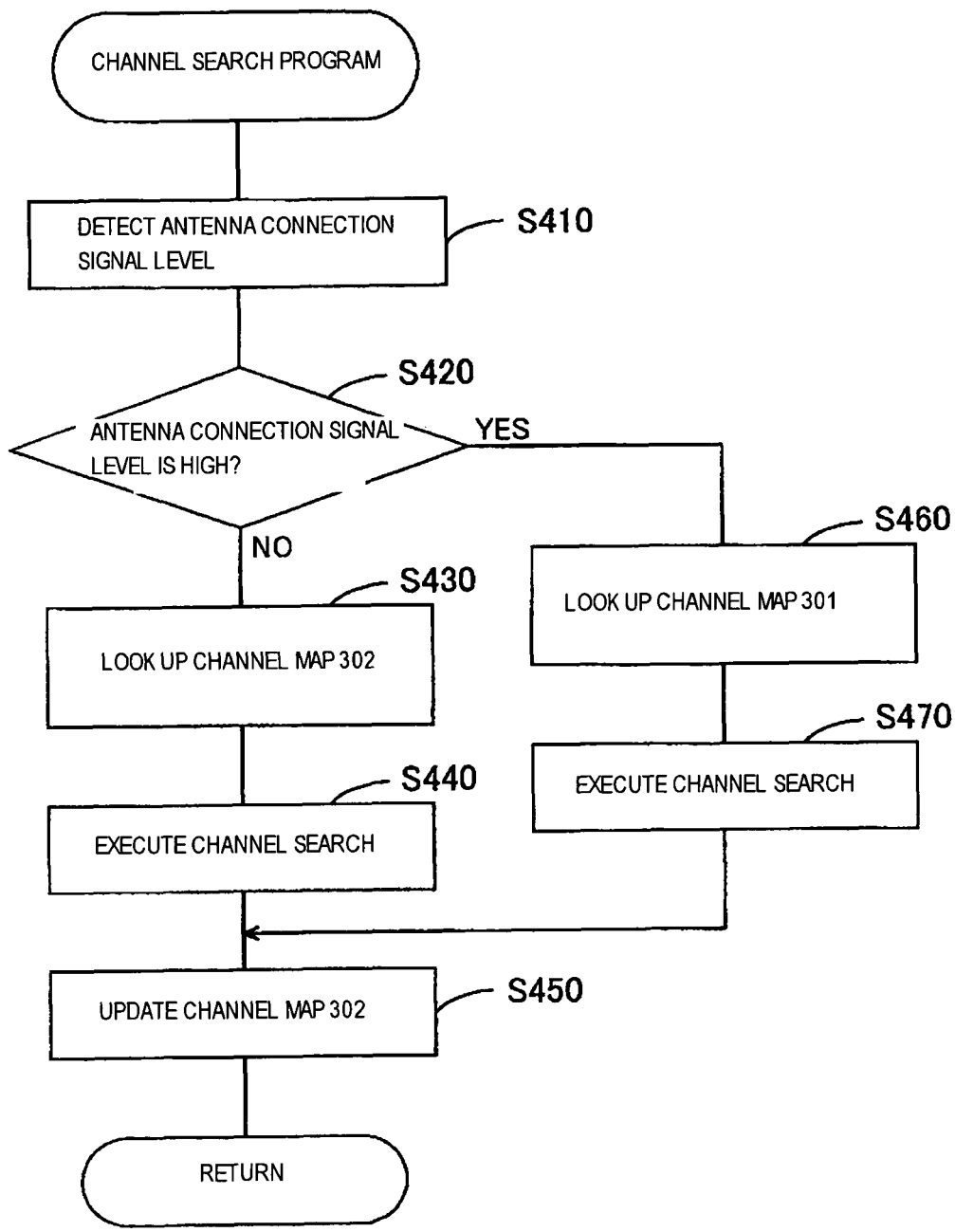

BROADCAST RECEPTION DEVICE AND ANTENNA CONNECTION DETECTION METHOD FOR BROADCAST RECEPTION DEVICE

CROSS-REFERENCES TO RELATED APPLICATIONS

The present application is related to the Japan Patent Application No. 2007-247308, filed Sep. 25, 2007, the entire disclosure of which is expressly incorporated by reference herein.

BACKGROUND OF THE INVENTION

1. Field of the Invention

The present invention relates to a broadcast reception device capable of having a smart antenna connected thereto, and specifically to those adapted to detect whether or not the antenna is connected thereto.

2. Description of the Related Art

There is known a smart antenna capable of switching the direction of the directivity to receive airwaves transmitted from different directions. Smart antennas control a plurality of antenna elements to adjust receiving sensitivity in every direction. Therefore, the smart antennas are different from uni-directional antenna having fixed directivity in channel search method. Here, the channel search denotes a process of tuning channels the antenna can receive. Therefore, in the receiver to which the smart antenna and the uni-directional antenna can selectively be connected, the user is made to discriminate the antenna connected thereto, and the channel search is automatically processed on the receiver side based on the discrimination result.

As an example thereof, by displaying a menu panel for selecting the type of the antenna on a screen and the user designating the type of the antenna on the menu panel, the receiver selects a setting method of the channel. Such a channel search method based on the designation by the user requires the user performing the operation to recognize the type of the antenna connected thereto.

As a method of automatically setting the channel search, there is disclosed a technology for switching the channel search corresponding to the antenna connected there to, utilizing the receiving strength varied in response to the smart antenna switching the direction of the directivity (see, e.g., JP-A-2006-25199 (Patent Document 1) and JP-A-2006-157338 (Patent Document 2)).

Further, although the channel search is not performed automatically, there is disclosed a technology of discriminating the type of an antenna connected to in-vehicle equipment based on the value of a voltage applied to an antenna resistance (see, e.g., JP-A-2006-186967 (Patent Document 3)).

Further, although the channel search is not performed automatically, there is disclosed a technology of discriminating the type of an antenna connected to in-vehicle equipment by monitoring a current flowing in an amplifier of the in-vehicle equipment (see, e.g., JP-A-2005-354253 (Patent Document 4)).

Further, there is disclosed a technology of switching the antenna with which a television broadcast signal is received by operating an antenna changing-over switch for switching the connection of different antennas when receiving the television broadcasting (see, e.g., JP-A-2006-157340 (Patent Document 5)).

The technologies according to the Patent Documents 1 and 2 described above have the following problems. That is, the method of discriminating whether or not the smart antenna is connected based on the receiving strength causes the necessity of driving the smart antenna once for detecting the receiving strength in every direction. Therefore, in the case in which the uni-directional antenna is connected, the channel search process in the smart antenna described above has no meaning, and the time taken by this process becomes a waste.

Further, since the technologies according to the Patent Documents 3 and 4 are not the technologies for automatically performing the channel search, it is hard to apply them to the present case.

Further, the technology according to the Patent Document 5 is for performing switching by making the user operate the antenna changing-over switch, but not for performing the channel search automatically.

BRIEF SUMMARY OF THE INVENTION

The present invention discloses a broadcast reception device including a connection section for connecting to a smart antenna that switches directivity or a unidirectional antenna with fixed directivity connected; a first channel search section for executing channel search in the smart antenna; a second channel search section for executing channel search in the uni-directional antenna; a communication section for providing the connected smart antenna with power and a control signal; and a connection detection section for detecting a voltage of the communication section varied by voltage drop caused by the communication section connected to the smart antenna, and detect one of presence and absence of connection of the smart antenna based on a result of the detection, the first channel search section is selected to execute the channel search when the connection detection section detects the connection of the smart antenna, and the second channel search section is selected to execute the channel search when the connection detection section does not detect the connection of the smart antenna.

These and other features, aspects, and advantages of invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and the drawings are to be used not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments.

FIGS. 3A and 3B are diagrams for explaining channel maps in an illustrative manner.

FIG. 4 is a flowchart of an example representing a process executed by a CPU 211 based on a channel search program 400.

DETAILED DESCRIPTION OF THE INVENTION

Figure 1:
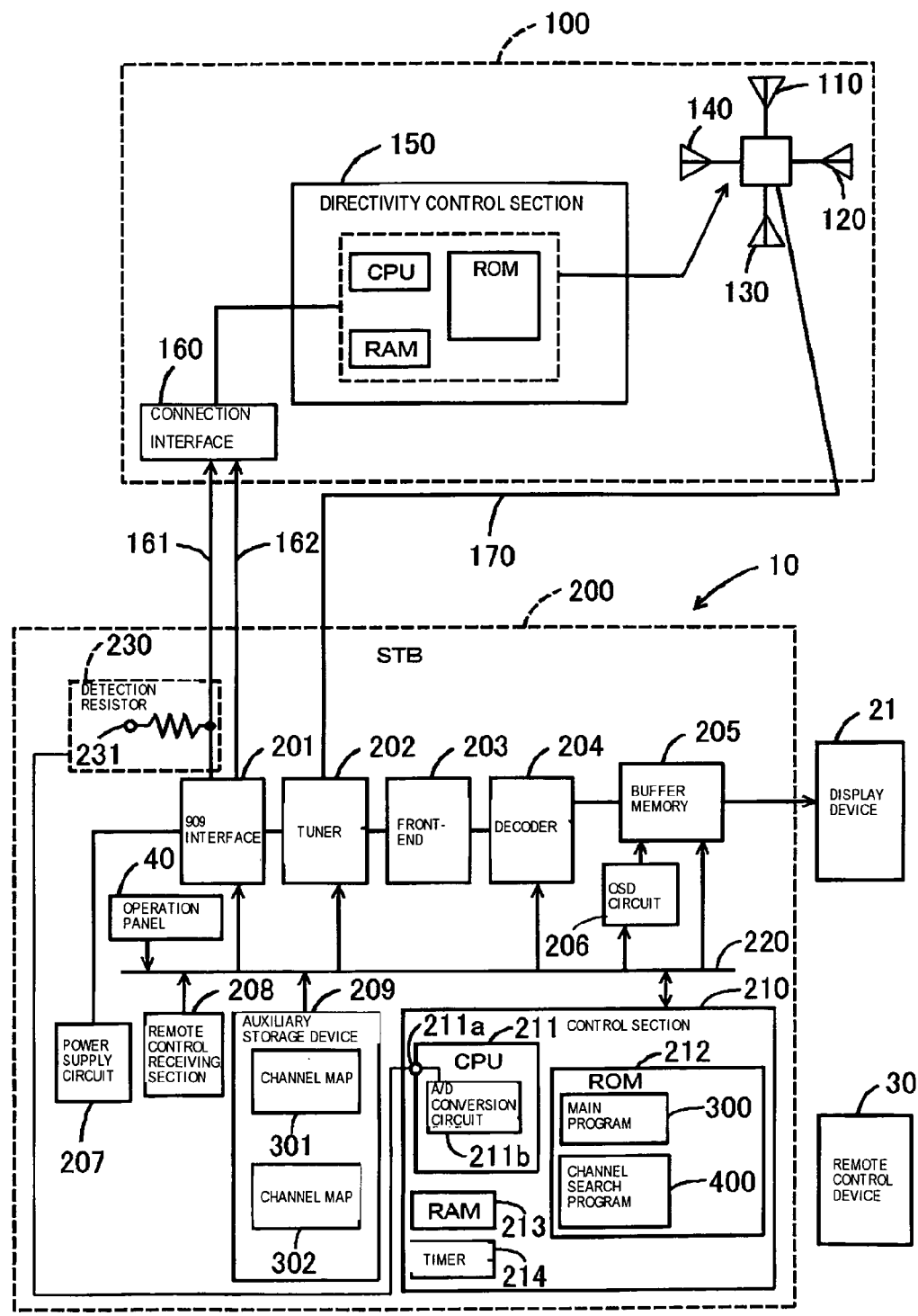
FIG. 1 is a block diagram of an example for explaining a broadcast reception device according to the present invention.

The detailed description set forth below in connection with the appended drawings is intended as a description of presently preferred embodiments of the invention and is not intended to represent the only forms in which the present invention may be constructed and or utilized.

Hereinafter, some embodiments of the present invention will be explained along the following order. It should be noted that in the drawings, parts identical or corresponding to each other will be denoted with the same reference numerals and the explanations therefor will not be repeated.
1. First Embodiment
    1.1. Configuration of Broadcast Reception Device
    1.2. Configuration of Smart Antenna
    1.3. Configuration of STB
    1.4. Channel Search Method
2. Second Embodiment
3. Modified Examples

1. First Embodiment

1.1. Configuration of Broadcast Reception Device

FIG. 1 is a block diagram for explaining a broadcast reception device according to the present invention. The broadcast reception device 10 according to the present invention has a connector (connection section) that can be connected to the smart antenna 100 capable of changing the direction of the directivity and a Yagi antenna (not shown) as the unidirectional antenna with fixed directivity. Here, the smart antenna 100 optimally receives the broadcast signals transmitted from broadcast stations in different directions by switching the direction of the directivity of the antenna it self.

The present broadcast reception device 10 is composed of a set-top box (hereinafter abbreviated as STB) 200, a display device 21, and a remote control device 30, and is connectable to either one of the smart antenna 100 and the Yagi antenna.

The broadcast reception device 10 receives the broadcast signal transmitted from either one of the smart antenna 100 and the Yagi antenna with the STB 200 to generate a video signal and an audio signal from the broadcast signal, and outputs these signals to the display device 21. The display device 21 displays a picture on a monitor based on the video signal thus received, and outputs a sound from a speaker based on the audio signal. It should be noted that the display device 21 can be any devices outputting pictures and sounds, such as a liquid crystal display device or a plasma display device.

Further, in the case in which a tuning process by the STB 200 and a so-called channel search, which is a process for assigning the tuned channels to channel numbers of the remote control device 30 and an operation panel 40, are executed, the present broadcast reception device 10 executes the channel search corresponding to the type of the antenna connected thereto. Specifically, in the case with the Yagi antenna, reception setting of a band assigned to each of the channels and a process of assigning the received channels to the operation keys are executed. Further, in the case with the smart antenna 100, in addition to the processes described above, a process of setting the direction of the directivity corresponding to each of the channels becomes necessary. Therefore, the present broadcast reception device 10 holds a channel map (described later) storing parameters in the channel search for each of the antennas, and executes the channel search corresponding to the antenna looking up the channel map corresponding to the type of the antenna connected thereto.

1.2. Configuration of Smart Antenna

The smart antenna 100 switches the direction of the directivity based on a control signal transmitted from the STB 200.

The smart antenna 100 has antenna elements 110 through 140 for receiving airwaves, and a directivity control section 150 for controlling driving the antenna elements 110 through 140. The smart antenna 100 in the present embodiment has four antenna elements 110 through 140 arranged radially, and the directivity control section 150 can change the direction in which the smart antenna 100 has high directivity 16 ways by changing the electric field intensity detected by the antenna elements 110 through 140.

Figure 2:
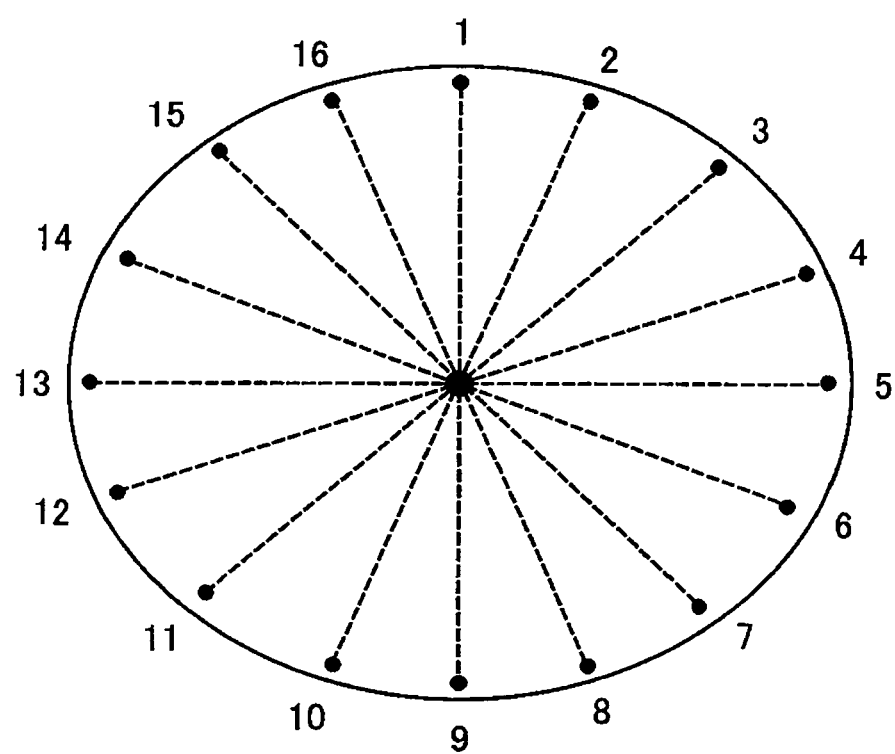
FIG. 2 is a diagram of an example for explaining the directivity of a smart antenna 100.

FIG. 2 is a diagram for explaining the directivity of the smart antenna 100. As shown in the drawing, the smart antenna 100 can switch the directivity to 16 directions. Further, the antenna elements 110 through 140 are connected to a tuner (described later) of the STB 200 to send the airwave thus received to the STB 200 via an RF cable 170.

The directivity control section 150 controls the antenna elements 110 through 140 to change the directivity in the smart antenna 100 to the 16 directions explained with reference to FIG. 2. The directivity control section 150 is provided with a central processing unit (CPU), a read-only memory (ROM), a random access memory (RAM), and when the directivity control section 150 receives an antenna control signal for controlling the directivity from the STB 200, it controls the directivity of each of the antenna elements 110 through 140 based on the antenna control signal. Here, the antenna control signal is for changing the directivity of each of the antenna elements 110 through 140 compliant to, for example, EIA/CEA-909 standard.

The connection interface 160 receives the antenna control signal for controlling the antenna elements 110 through 140 and a power source voltage for driving the smart antenna from the STB 200. It should be noted that the connection interface 160 receives the antenna control signal via wiring 161, and receives the power supply voltage via wiring 162. The antenna control signal and the power supply voltage thus received are transmitted to the directivity control section 150. As an example, specifications of the power supply voltage supplied from the connection interface 160 to the directivity control section 150 are 12 volts and 150 mA.

1.3. Configuration of STB

The STB 200 generates the video signal and the audio signal based on the broadcast signal received from the smart antenna 100. Further, by the tuning operation using the remote control device 30 and so on, the directivity of the smart antenna 100 is switched in accordance with the channel thus tuned. The STB 200 has a configuration of including a connection interface 201 (communication section), a tuner 202, a front-end 203, a decoder 204, a buffer memory 205, an OSD circuit 206, a power supply circuit 207, a remote control receiving section 208, an auxiliary storage device 209, a control section 210, and a detection resistor 230 (connection detection section). The sections other than the detection resistor 230 are connected to each other using an external bus 220, and execute the communication using the external bus 220.

The connection interface 201 supplies the smart antenna 100 with the antenna control signal and the power supply voltage in compliance with the EIA/CEA-909 standard. It should be noted that the connection interface 201 is provided with jacks as terminals for transmitting signals and is connected to the connection interface 160 of the smart antenna 100 using the wiring 161, 162.

The tuner 202 detects the channel (e.g., a virtual channel) thus tuned from the broadcast signal thus received. The tuner 202 is connected to the smart antenna 100. The tuner 202 detects the broadcast signal corresponding to a channel (the channel selected by the user) out of the broadcast signals transmitted from the smart antenna 100 via the RF cable 170 to output the detected broadcast signal to the front-end 203 along an instruction from the control section 210.

The front-end 203 converts the broadcast signal transmitted from the tuner 202 into an intermediate frequency signal, and outputs the intermediate frequency signal to the decoder 204 in accordance with an instruction input from the control section 210.

The decoder 204 executes a process corresponding to a predetermined file format (e.g., Motion Picture Experts Group-2 (MPEG-2)) on the broadcast signal output from the front-end 203, and decodes separately to the audio signal and the video signal along an instruction from the control section 210. Further, the video signal thus decoded is output to the buffer memory 205. There are some cases in which a check code is attached to the video signal thus decoded, and detection of the error rate of the video signal and the error correction are executed using the check code. It should be noted that the audio signal is output directly to the display device 21.

The buffer memory 205 functions as a temporary storage area when outputting the video signal decoded by the decoder 204 to the display device 21. The buffer memory is a semiconductor memory with a predetermined storage capacity, and the stored video signal is sequentially output from the buffer memory 205 to the display device 21.

The OSD circuit 206 superimposes a predetermined on-screen display (OSD) image on the video signal stored in the buffer memory 205, for example, along an instruction from the control section 210. The OSD image is, for example, an aggregation of character string for forming a menu panel, images, and sound data. The user can require each of the functions to the present broadcast reception device 10 by selecting an item displayed on the screen using the remote control device 30 or the like.

The remote control receiving section 208 receives various commands transmitted from the remote control device 30, and transmits the control signals based on the respective commands to the control section 210.

The power supply circuit 207 is for supplying the STB 200 and the smart antenna 100 with the power supply voltage. The power supply circuit 207 rectifies an alternating voltage supplied from the commercial power supply, and supplies the direct-current voltage thus generated to the STB 200 and the smart antenna 100. Further, the power supply circuit 207 is connected to the connection interface 201, thus supplying the smart antenna 100 with the direct current voltage via the wiring 161.

The detection resistor 230 is for detecting whether or not the smart antenna 100 is connected thereto based on the voltage value. The detection resistor 230 has a resistance section 231 connected in parallel to the wiring 161, and having a function as a resistance. Therefore, if the power supply current flows from the circuit 207 to the wiring 161 in the state in which the smart antenna 100 is connected to the STB 200, electro motive force is caused in the resistance section 231.

The auxiliary storage device 209 stores channel maps as the data to be looked up when tuning the stations. The auxiliary storage device 209 stores the channel map 301 for the Yagi antenna shown in FIG. 3A, and the channel map 302 for the smart antenna 100 shown in FIG. 3B. The channel maps 301, 302 are provided for performing registration of all receivable channels based on the data registered in the channel maps.

The channel maps 301, 302 are each provided with an area for storing physical channel numbers and virtual channel numbers, an area for detecting whether the channel is digital broadcasting or analog broadcasting, and an area for storing presence or absence of the scramble processing. Further, in the channel map 302 for the smart antenna 100, there are also stored the directions of the directivity of the smart antenna 100 corresponding the respective physical channel numbers in association with the respective physical channel numbers. The information stored in the channel maps 301, 302 is previously stored in, for example, an initial setting process of the broadcast reception device 10.

The control section 210 is composed of the CPU 211, the ROM 212, the RAM 213, and the timer 214. The CPU 211 executes various kinds of processing along various kinds of processing programs stored in the ROM 212. The ROM 212 is mainly provided with a program storage area for developing the processing program or the like executed by the CPU 211, and a data storage area for mainly storing the input data and the processing result generated in every execution of the processing program described above. The RAM 213 is a destination of loading of the data and the program stored in the ROM 212. Further, the timer 214 is for providing the CPU 211 with a function of a clock.

The CPU 211 executes calculation of the data along the various kinds of programs stored in the ROM 212, and outputs the calculation results to various parts via the external bus 220. Further, the CPU 211 has an analog/digital conversion port (hereinafter described as A/D port) 211a capable of receiving an analog signal. The A/D conversion port 211a accepts input of the voltage at the wiring between the resistance section 231 and the power supply circuit 207. It should be noted that the A/D conversion port 211a is connected to a digital/analog conversion circuit 211b (hereinafter referred to as an A/D conversion circuit) inside the CPU 211, thereby converting the analog signal input through the A/D conversion port 211a into the binarized digital signal. The digital signal thus converted inside the CPU 211 is used as an antenna connection signal.

In the case in which the smart antenna 100 is connected to the connection interface 201 of the STB 200, the electro motive force is generated at the resistance section 231 of the detection resistor 230. Therefore, the voltage value in the wiring connecting the resistance section 231 in the detection resister 230 and the power supply circuit 207 is lowered by the voltage drop. Consequently, the A/D conversion circuit 211b outputs the antenna connection signal in the low level. In contrast, in the case in which the smart antenna 100 is not connected to the connection interface 201 of the STB 200, the A/D conversion circuit 211b outputs the antenna connection signal in the high level.

The ROM 212 stores a system program executable in the STB 200, various kinds of processing programs executable on the system program, the data used when executing the processing programs, and data corresponding to various kinds of processing results obtained by arithmetic processing executed by the CPU 211. It should be noted that the programs are stored in the ROM 212 in the form of computer readable program codes. Specifically, the ROM 212 stores a main program 300 and a channel search program 400.

The main program 300 is a program for making the CPU 211 realize the control of the various functions in the broadcast reception device 10. The functions the CPU 211 is capable of controlling using the main program 300 include, for example, the function of receiving television broadcasting, the function of switching the channels, and the function for controlling the time point at which the channel search is executed.

The channel search program 400 is a program for making the CPU 211 search the tunable broadcast band, and at the same time, realize the function of assigning the tunable channels to the channel keys and up-down keys in the remote control device 30 and the operation panel 40. The channel search program 400 is executed by the CPU 211 when, for example, the time for beginning the channel search has been reached.

When executing the channel search, in the case in which the smart antenna 100 is connected to the STB 200, the CPU 211 controls the smart antenna 100 in all of the 16 directions thus defined as described above to judge whether or not the broadcasting can be received for every channel stored in the channel map 302. Thus, the broadcast reception device 10 can receive the airwaves transmitted from any directions in a good condition. It should be noted that in the case in which the Yagi antenna 30 is connected to the STB 200, the channel search is not performed.

1.4. Channel Search Method

Hereinafter, the processing executed by the CPU 211 in response to the broadcast reception device 10 being powered on will be explained with reference to drawings. It should be noted that in the following descriptions, the explanations are presented assuming that the smart antenna 100 is connected to the STB 200.

When the broadcast reception device 10 is powered on, the main program 300 is developed on the RAM 213. Firstly, the CPU 211 performs timing for judging whether or not it is time to execute the channel search using the timer 214. If it is judged that the time to execute the channel search has been reached, the CPU 211 output a channel search start signal for executing the channel search to the connection interface 201. Further, the CPU 211 loads the channel search program 400 to the RAM 213. It should be noted that if the result of the timing is not the time to execute the channel search, the CPU 211 waits until the time is reached.

FIG. 4 is a flowchart for representing a process executed by the CPU 211 based on the channel search program 400. The CPU 211 detects the value of the antenna connection signal (step S410). As described above, the antenna connection signal is a signal obtained by converting the value of the voltage between the detection resistor and the power supply circuit 207 input via the A/D conversion port 211a into a digital signal.

The CPU 211 discriminates the value of the antenna connection signal thus detected (step S420). Specifically, the value of the antenna connection signal is compared with a predetermined threshold value thereby detecting the voltage level of the signal. On this occasion, if the antenna connection signal is not in the high level, the CPU 211 determines that the smart antenna 100 is connected to the connection interface 201 if the STB 200, and proceeds to the step S430.

In the step S430, the CPU 211 looks up the channel map 302 stored in the auxiliary storage device 209. In the channel map 302, there are stored various kinds of data for executing the channel search on the smart antenna 100 as described above. Further, if the antenna connection signal is in the low level, it proceeds to the step S460 on the judgment that the Yagi antenna is connected.

In the step S440, the CPU 211 firstly selects a specific physical channel. Then, the CPU 211 outputs the antenna control signal so that the direction of the directivity in the smart antenna 100 is set to "1" as explained with reference to FIG. 2. The CPU 211 switches the direction of the directivity of the smart antenna 100 to the directions of 1 through 16 as explained with reference to FIG. 2 to measure the receiving strength of each of the directions. Here, as the method of measuring the receiving strength, there can be cited a method of measuring the strength of the received wave, and a method of measuring the error rate value after decoding the wave, which is detected in every direction, using the decoder 204.

In the step S450, the CPU 211 updates the area of the channel map 302 in which the directions of the directivity are stored. Here, the value to be updated is the direction of the directivity in which the highest receiving strength is measured of the receiving strengths detected by the CPU 211. The process described above is executed on every physical channel stored in the channel map 302. Further, on this occasion, the CPU 211 also updates the values of other data stored in the channel map 302. These steps executed by the CPU 211 realize the function of the first channel search section.

It should be noted that the channel search for the Yagi antenna in the steps S460 through S470 is a well-known technology, and explanations therefor will be omitted. Further, these steps executed by the CPU 211 realize the function of the second channel search section.

By the series of steps described above, the present broadcast reception device 10 discriminates whether the antenna connected to the STB 200 is the smart antenna 100 or the Yagi antenna, and performs individual channel search corresponding to the antenna connected thereto. Therefore, even in the case in which the user does not recognize the type of the antenna connected thereto, the STB 200 can automatically execute the channel search corresponding to the antenna connected thereto. Since in the uni-directional antenna such as the Yagi antenna, it is not required to switch the direction of the directivity for every channel search, the process period can be reduced in the case in which the Yagi antenna is connected thereto.

2. Second Embodiment

In the first embodiment described above, whether or not the smart antenna 100 is connected is detected by detecting the variation of the voltage value of the wiring for supplying the smart antenna 100 with the power supply voltage. However, it is also possible to adopt a configuration for detecting the voltage value of the wiring for transmitting the antenna control signal from the connection interface 201 to the smart antenna 100.

Figure 5:
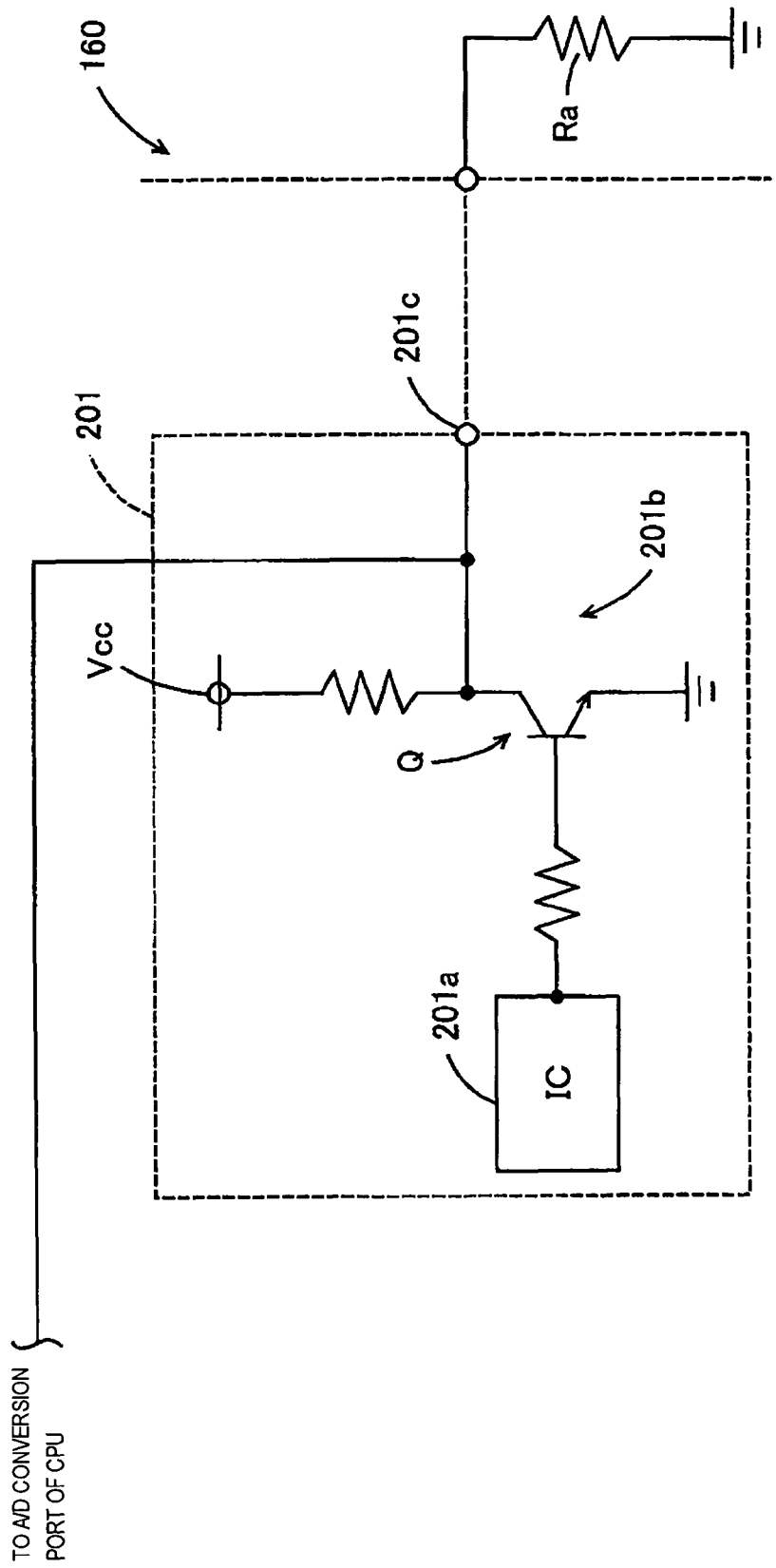
FIG. 5 is a diagram of an example for explaining voltage detection in a second embodiment.

FIG. 5 is a diagram for explaining voltage detection in the second embodiment. According to the drawing, the connection interface 201 has a configuration including an IC 201a for supplying the smart antenna 100 with the antenna control signal in response to the instruction from the control section 210, and a signal amplification circuit 201b for converting the signal output from the IC 201a. It should be noted that the A/D conversion port 211a of the CPU 211 is connected to the wiring between the output terminal of the signal amplification circuit 201b and the output terminal 201c in the connection interface 201. Further, the connection interface 201 can be connected to the smart antenna 100 through the connection interface 160 as described above.

The signal amplification circuit 201b is for converting the output voltage of the low-power consumption IC from 3.3V into 5V. The signal amplification circuit 201b is provided with a constant voltage source Vcc with voltage level of 5V and a transistor Q, and when the base current to the base of the transistor Q is blocked in response to the signal of substantially 0V output from the IC 201a, the transistor Q becomes off, and the voltage of 5V is applied from the constant voltage source Vcc connected to the collector. The 5V signal thus applied is transmitted to the smart antenna 100 as the antenna control signal. It should be noted that in the present broadcast reception device 10, it is assumed that since the CPU 211 cannot discriminate which antenna is connected before the channel search is performed, the CPU 211 firstly outputs a signal for executing the channel search to the connection interface 201.

According to the configuration described above, in the case in which the connection interface 201 is not connected to the smart antenna 100, firstly the voltage between the output terminal of the signal amplification circuit 201*b* and the output terminal 201*c* of the connection interface 201 is 5V in the condition in which the signal of substantially 0V is output from the IC, and the A/D conversion circuit 211*b* of the CPU 211 converts the analog voltage of 5V into the antenna connection signal of the high level.

In the case in which the connection interface 201 is connected to the smart antenna 100, the following occurs. It should be noted that the combined resistance of the smart antenna 100 in the connection interface 160 is defined as Ra. In the case in which the smart antenna 100 is connected via the connection interfaces 160 and 201, since the combined resistance Ra in the connection interface 160 is connected in series with the output terminal 201*c* of the connection interface 201, the voltage input to the A/D conversion port 211*a* is lowered by the voltage drop caused by the current flowing through the combined resistance Ra. Therefore, the digital signal obtained by the conversion by the A/D conversion circuit 211*b* becomes the low level.

By applying the signal input to the A/D conversion port 211*a* to the detection process in the step S410 explained with reference to FIG. 4, whether or not the smart antenna 100 is connected is detected by the control section 210.

3. Modified Examples

The present broadcast reception device has various modified examples.

For example, in the channel search process, it is also possible to perform the scan for the smart antenna at the first channel, and change the directivity of the antenna elements 110 through 140 to the channel, thereby changing the directivity to the discovered channel to detect the variation of the receiving strength. It should be noted that on this occasion, the method of detecting the field intensity can use the signal-to-noise ratio (S/N) in the received wave, or the error rate in the video signal decoded by the decoder 204.

Specifically, in the case in which the S/N ratio and the error rate of the received wave is varied by outputting the antenna control signal for changing the directivity of the antenna elements 110 through 140 and receiving the wave, it can obviously be judged that the directivity is varied so that the receiving condition of the wave becomes the optimum. Therefore, it can be judged that the antenna connected to the STB 200 is the smart antenna.

In the invention configured as described above, the present broadcast reception device can have the smart antenna capable of switching the directivity and the uni-directional antenna with the fixed directivity connected thereto. In such a broadcast reception device, the first channel search setting section executes the channel search in the smart antenna. Further, the second channel search section executes the channel search in the uni-directional antenna. Further, the communication section provides the smart antenna thus connected with the power supply and the control signals. Further, the connection detection section detects the voltage of the communication section varied by the voltage drop caused by the communication section being connected to the smart antenna, thus presence or absence of the connection of the smart antenna is detected based on the detection result. Further, when the connection detection section detects the connection of the smart antenna, the control section selects the first channel search section to make the first channel search section execute the channel search, and when the connection detection section does not detect the connection of the smart antenna, the control section selects the second channel search section to make the second channel search section execute the channel search.

Therefore, since the type of the antenna connected thereto is detected by detecting the voltage of the communication section, the channel search corresponding to the type of the antenna connected thereto can be executed without driving the antenna, thus the processing period of the channel search in the case of not connecting the smart antenna can be reduced. Therefore, it is possible to provide the broadcast reception device automatically detecting whether the antenna connected thereto is the multi-directional antenna or the uni-directional antenna and automatically executing the channel search based on the detection result.

The connection detection section preferably detects the variation in the voltage of the wiring for supplying the power supply voltage from the communication section to the smart antenna.

According to the invention configured as described above, since the voltage of the wiring for supplying the power supply voltage is measured, the type of the antenna can easily be detected by detecting the voltage.

As another aspect of the invention, the connection detection section preferably detects the variation in the voltage of the wiring for transmitting a control signal from the communication section to the smart antenna.

According to the invention configured as described above, since the voltage of the wiring for transmitting the control signal is detected, the type of the antenna can easily be detected by detecting the voltage.

The smart antenna described above preferably has a configuration of only receiving the signals transmitted from the communication section and not returning a signal to the present broadcast reception device in compliance with the EIA/CEA-909 standard.

According to the invention configured as described above, the presence or absence of the connection of the antenna can be detected even in a control method with one-way signal communication.

Further, as another aspect of the invention, the smart antenna has a configuration of only receiving the signals transmitted from the communication section and not returning a signal to the present broadcast reception device in compliance with the EIA/CEA-909 standard, the communication section is an interface for providing the smart antenna with the power supply voltage and the control signal in compliance with the EIA/CEA-909 standard, and the connection detection section detects the variation in voltage of the wiring for supplying the power supply voltage from the communication section to the smart antenna to judge that the smart antenna is connected if the detected voltage is lower than a predetermined threshold value and that the smart antenna is not connected if the detected voltage is higher than the predetermined threshold value.

It should be noted that it is obvious that the present invention is not limited to the embodiments described above. It is obvious to those skilled in the art that the following matters are disclosed as embodiments of the present invention.

To apply the members replaceable with each other or configurations and so on replaceable with each other disclosed in the embodiments described above with the combination thereof appropriately modified.

To appropriately replace the member, configuration, and so on not disclosed in the embodiments described above and included in the known technology and replaceable with the member, configuration, and so on disclosed in the embodiments described above, or to apply the member, configuration, and so on not disclosed in the embodiments described above and included in the known technology and replaceable with the member, configuration, and so on disclosed in the embodiments described above with the combination thereof modified.

To appropriately replace the member, configuration, and so on disclosed in the embodiments described above with the member, configuration, and so on not disclosed in the embodiments described above and assumed by those skilled in the art to be the replacements of the member, configuration, and so on disclosed in the embodiments described above, or to apply the member, configuration, and so on not disclosed in the embodiments described above and assumed by those skilled in the art to be the replacements of the member, configuration, and so on disclosed in the embodiments described above with the combination thereof modified.

What is claimed is:

1. A broadcast reception device having, comprising:
   a smart antenna switching directivity based on a control signal and not returning a signal in compliance with the EIA/CEA-909 standard;
   a unidirectional antenna with fixed directivity;
   a set top box connected to the smart antenna or the unidirectional antenna and obtaining airwave received by the smart antenna or the unidirectional antenna via an RF cable;
   wherein the set top box comprising,
      a controller outputting the control signal,
      a power supply circuit generating a power supply voltage,
      a connection interface connected to the smart antenna with a first wiring and a second wiring, supplying the smart antenna with the power supply voltage via the first wiring and supplying the smart antenna with the control signal via the second wiring,
      a connection detection section detecting a voltage of the first wiring by using a resistance connected in parallel with the first wiring,
   wherein the controller selects whether a channel search is executed in the smart antenna or in the uni-directional antenna based on the value of the detected voltage of the first wiring,
   the controller judges that the smart antenna is connected if the detected voltage of the first wiring is lower than a predetermined threshold value and that the smart antenna is not connected if the detected voltage of the first wiring is higher than the predetermined threshold value,
   the controller executes channel search in the smart antenna when it is judged that the smart antenna is connected, and executes channel search in the uni-directional antenna when it is judged that the smart antenna is not connected.

* * * * *